US006352276B1

United States Patent
Hill

(10) Patent No.: US 6,352,276 B1
(45) Date of Patent: Mar. 5, 2002

(54) LIGHTWEIGHT BICYCLE FORK

(75) Inventor: Gregory A. Hill, Sunland, CA (US)

(73) Assignee: Marzocchi, USA, Inc., Valencia, CA (US)

(*) Notice: Subject to any disclaimer, the term of this patent is extended or adjusted under 35 U.S.C. 154(b) by 0 days.

(21) Appl. No.: 09/421,848

(22) Filed: Oct. 20, 1999

(51) Int. Cl.[7] .............................................. B62K 21/02
(52) U.S. Cl. ...................................... 280/279; 280/280
(58) Field of Search ................................ 280/276, 277, 280/279, 280

(56) References Cited

U.S. PATENT DOCUMENTS

| | | | | |
|---|---|---|---|---|
| 3,910,600 A | * | 10/1975 | Sprick | 280/276 |
| 5,238,259 A | * | 8/1993 | Wilson et al. | 280/276 |
| 5,290,052 A | * | 3/1994 | Bontrager | 280/279 |
| 5,603,521 A | * | 2/1997 | Bontrager | 280/279 |
| 5,626,355 A | * | 5/1997 | Voss et al. | 280/276 |
| 5,653,007 A | * | 8/1997 | Boyer et al. | 29/460 |
| 5,667,234 A | * | 9/1997 | Zirk et al. | 280/276 |
| 5,833,259 A | * | 11/1998 | Stewart | 280/276 |
| 5,848,799 A | * | 12/1998 | Huan | 280/276 |
| 5,860,666 A | * | 1/1999 | Akamatsu | 280/276 |
| 5,908,200 A | * | 6/1999 | Stewart | 280/276 |
| 5,924,714 A | * | 7/1999 | Farris et al. | 280/276 |

* cited by examiner

Primary Examiner—Robert J. Oberleitner
Assistant Examiner—L. Lum
(74) Attorney, Agent, or Firm—Christie, Parker & Hale, LLP

(57) ABSTRACT

A lightweight bicycle fork which includes a crown, a stem and a pair of opposed tubular struts. The stem is fitted into a bore in a central position of the crown and extends above the top surface of the crown. The pair of opposed struts are disposed to extend downwardly from the bottom surface of the crown. The struts are attached to the crown by being disposed within opposed bores within the crown and secured within the crown by threadable end caps. To prevent the rotation of the struts within the crown, longitudinal ribs can be disposed within the external surface of the struts which mate with matching grooves within the internal surface of the bores. The struts are reenforced with an internal web to strengthen the struts with respect to axial and lateral forces. The bicycle fork is made from lightweight materials such as aluminum.

26 Claims, 6 Drawing Sheets

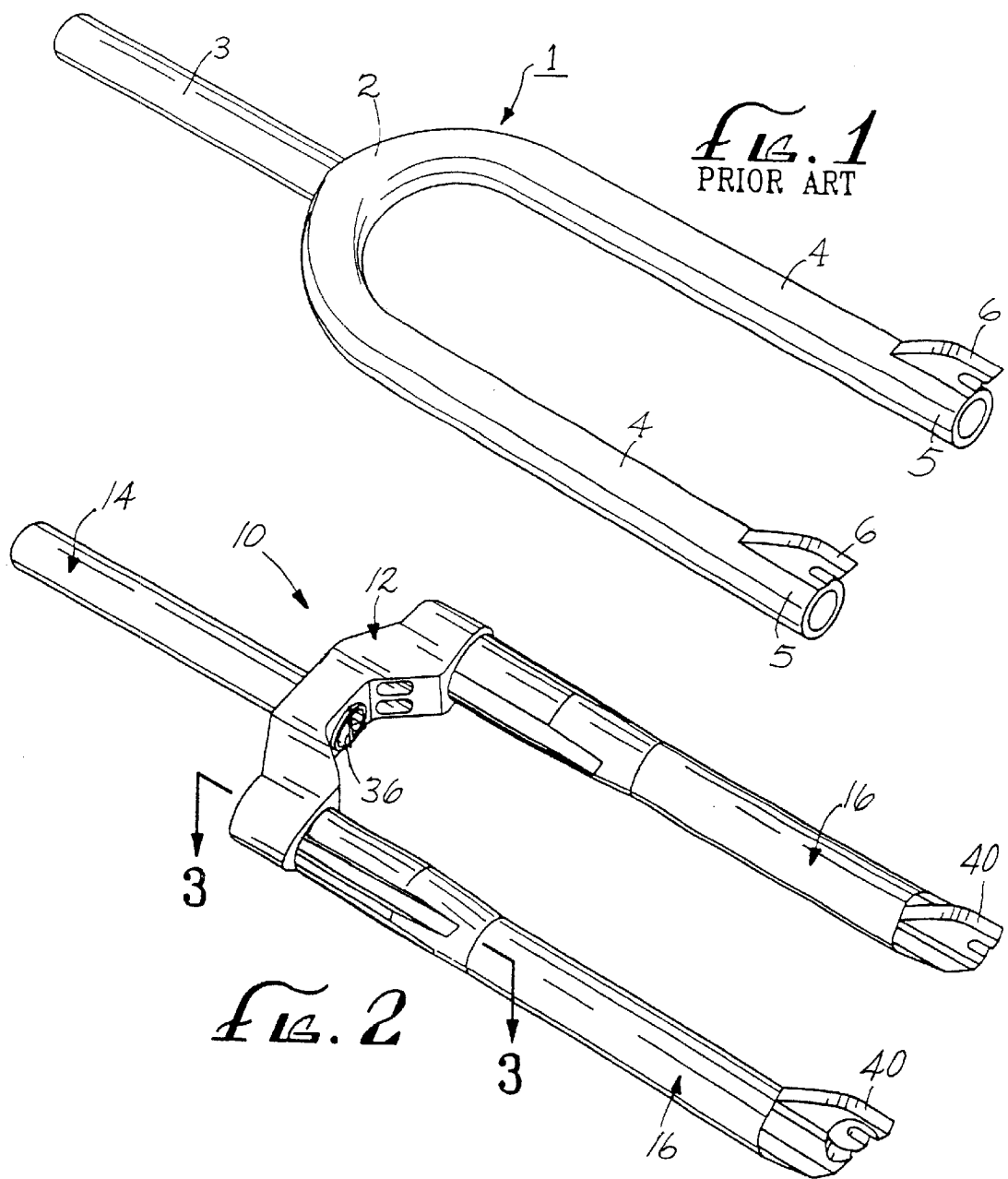

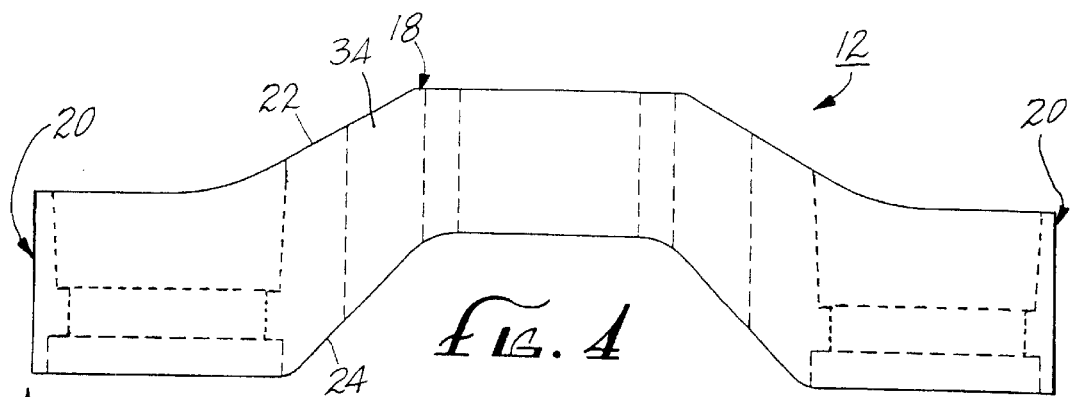
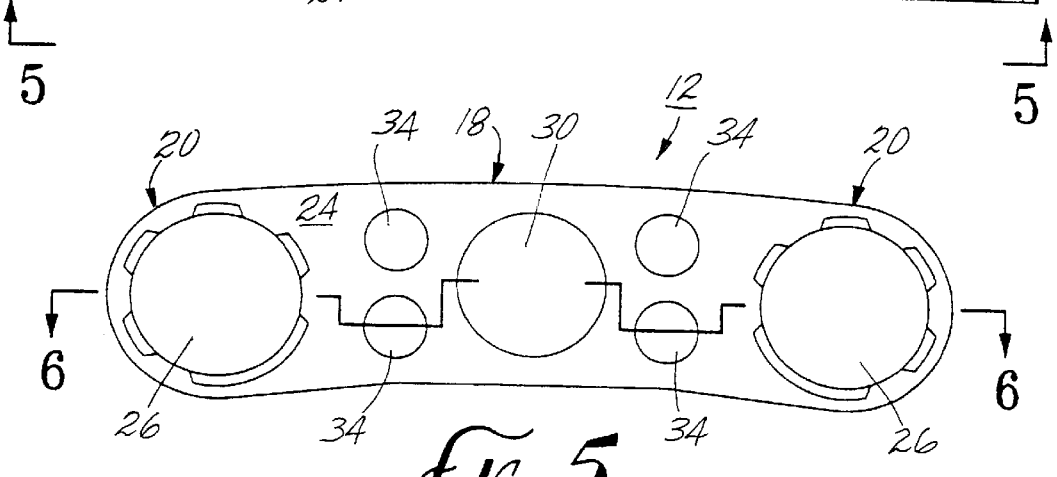
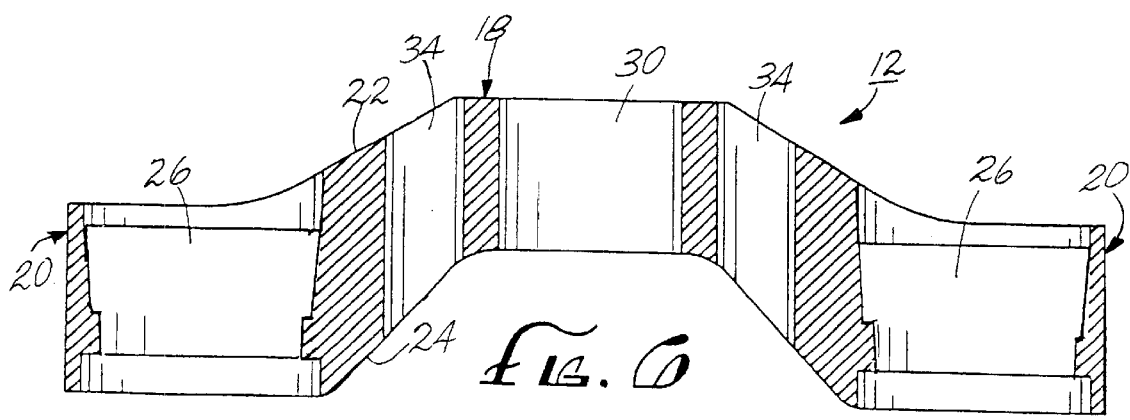

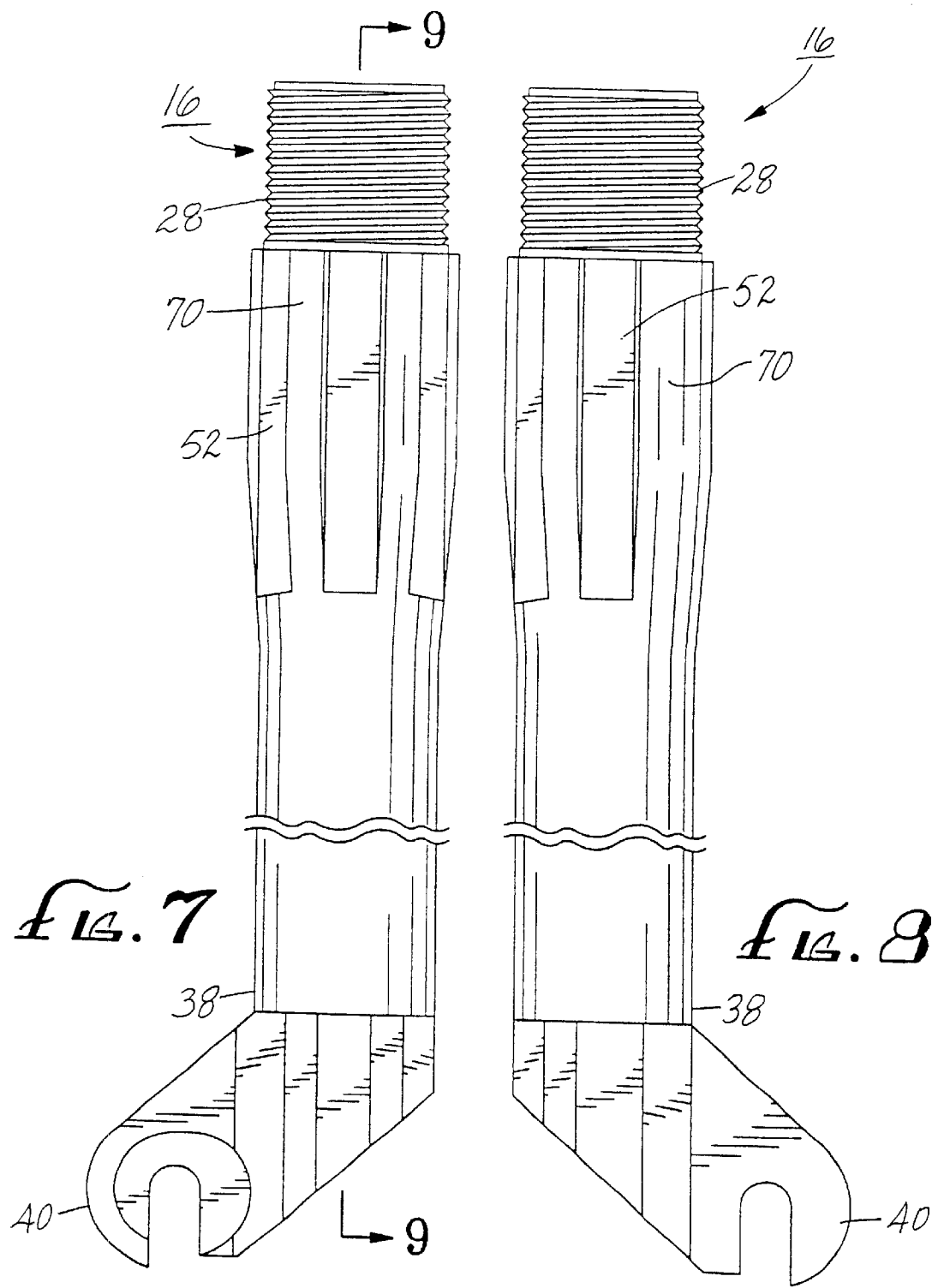

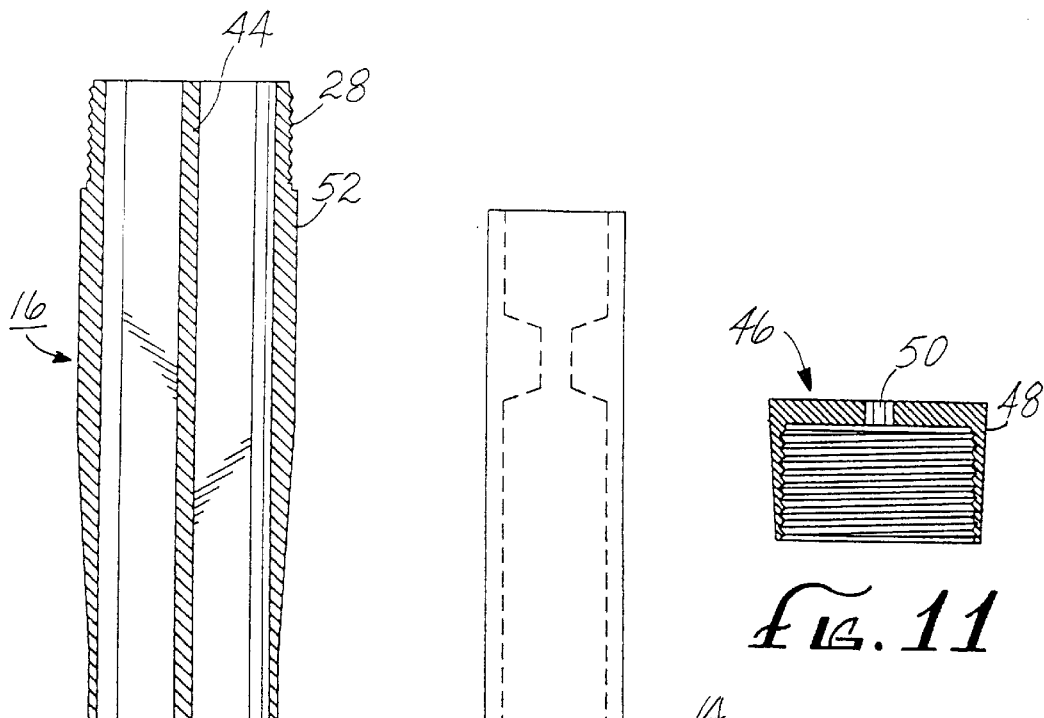
FIG. 9
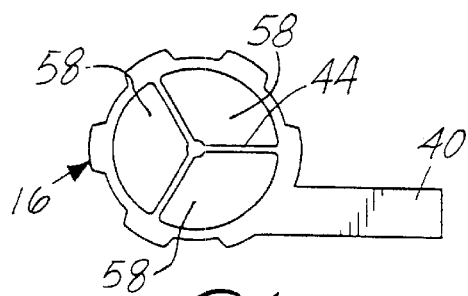
FIG. 10
FIG. 11
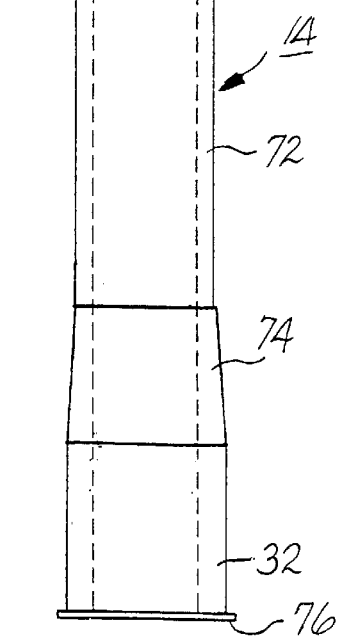
FIG. 12

LIGHTWEIGHT BICYCLE FORK

FIELD OF THE INVENTION

This invention relates generally to bicycles and, more particularly, to bicycle forks.

BACKGROUND OF THE INVENTION

Bicycles have provided the world's population with an important mode of transportation and pleasurable recreation for over 100 years. Because bicycles are propelled solely by the muscle power of the user, it is important that the bicycle be constructed of the lightest possible material which can adequately withstand the day-to-day stresses placed on the bicycle. Heretofore, the conventional wisdom has been that bicycles must generally be constructed from steels or materials of similar density. Many attempts have been made to construct bicycles from lighter weight materials, ut none of those efforts have been wholly successful.

One of the principal problems in constructing a bicycle from lightweight materials arises from the extreme stresses placed upon the fork portions of a bicycle. The front forks receive considerable impact and axial stresses applied to the bicycle by contact of the bicycle with rough terrain. Because bicycle forks are narrow and elongate, they are especially subject to deformation when constructed from materials that are weaker than steel.

Some manufacturers have resorted to constructing bicycle forks from special alloys and material having a low density and steel-like strength. Materials such as titanium, magnesium and carbon fiber composites fall within this category. Unfortunately, bicycle forks made from such materials tend to be expensive.

Accordingly, there is a need for a lightweight bicycle fork which avoids the problems the prior art.

BRIEF SUMMARY OF THE INVENTION

The invention satisfies this need. The invention is a bicycle fork comprising (a) a crown having a central portion, a pair of opposed side portions, a top surface and a bottom surface, (b) a stem having a top end and a bottom end, the bottom end of the stem being connected to the central portion of the crown such that the stem projects upwardly above the top surface of the crown, and (c) a pair of opposed tubular struts, each having a top end and a bottom end, the top end of each strut being mechanically attached to one of the opposed side portions of the crown such that the struts project downwardly from the bottom surface of the crown in parallel to one another. Each strut is made from a lightweight material, and each strut is preferably internally reinforced with a reinforcing web to strengthen the strut with respect to axial and lateral forces.

In a preferred embodiment, a pair of spaced-apart bores are provided in the pair of opposed side portions of the crown and each strut is secured within a respective bore by a threadably attached end cap, such mechanical attachment of the forks to the crown rigidly retaining the struts within the crown without need of welding or other such attachment means. In a further preferred embodiment, both struts are prevented from rotating within the bores by longitudinal ribs which nest within corresponding grooves in each bore.

The invention is ideally suited for bicycle forks constructed from aluminum, and other such materials.

The invention has been found to provide an inexpensive bicycle fork having considerable strength, but which weighs markedly less than conventional steel forks.

DESCRIPTION OF THE DRAWINGS

These features, aspects and advantages of the present invention will become better understood with regard to the following description, appended claims and accompanying figures:

FIG. 1 is a perspective view of a bicycle fork of the prior art;

FIG. 2 is a perspective view of a bicycle fork having features of the invention;

FIG. 4 is a side view of a crown component of the bicycle fork illustrated in FIG. 2;

FIG. 5 is a bottom view of the crown illustrated in FIG. 4;

FIG. 6 is a cross-sectional side view of the crown illustrated in FIG. 5, taken along view lines 6—6;

FIG. 7 is a first side view of a bicycle strut;

FIG. 8 is an opposite side view of the bicycle strut illustrated in FIG. 7;

FIG. 9 is a cross-sectional detail view of the bicycle strut illustrated in FIG. 7, taken along view lines 9—9;

FIG. 10 is a bottom end view of the bicycle strut illustrated in FIGS. 7 and 8;

FIG. 11 is a cross-sectional side view of an end cap;

FIG. 12 is a side view of a bicycle stem; and

DETAILED DESCRIPTION OF THE PREFERRED EMBODIMENT

Figure 3:
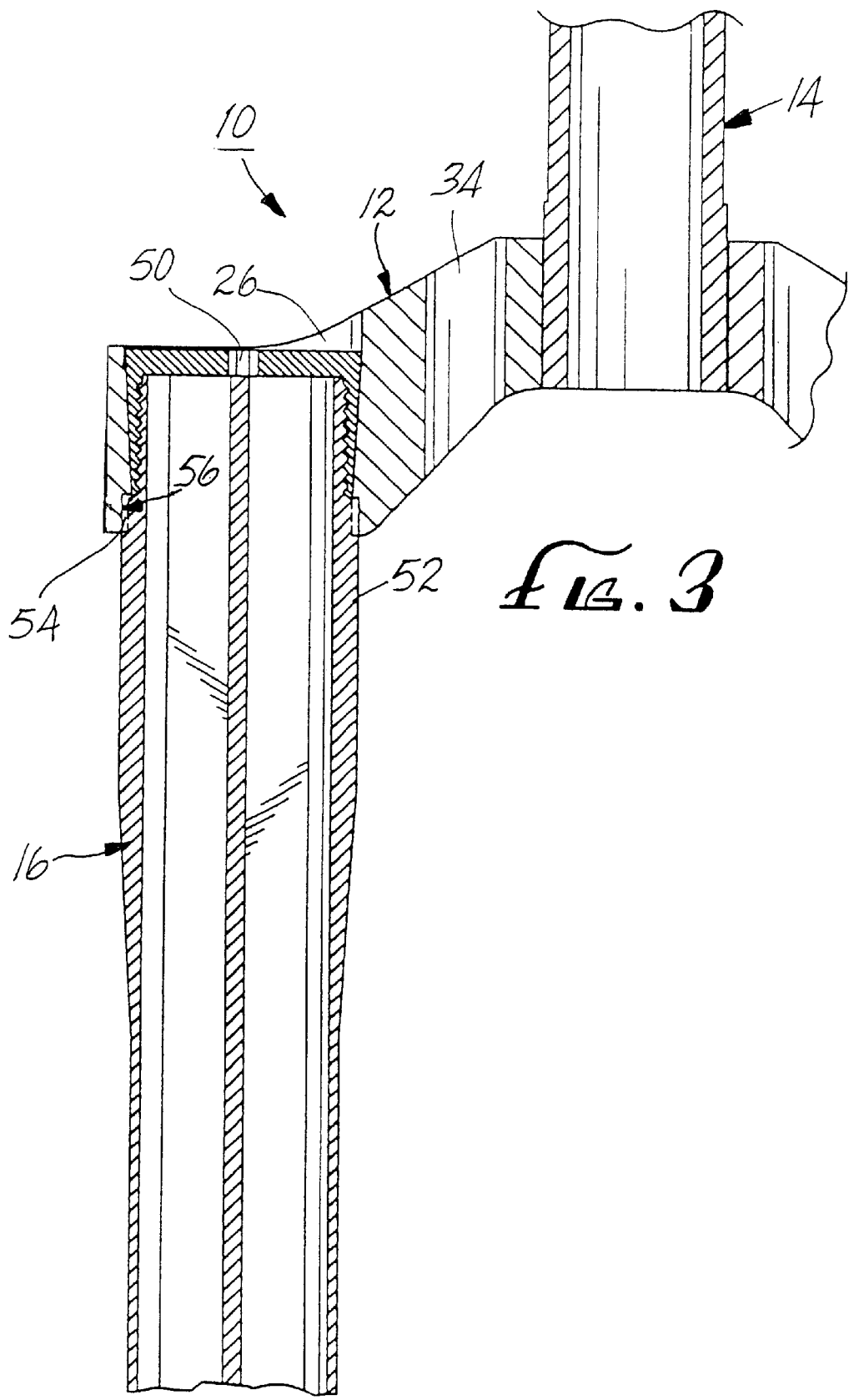
FIG. 3 is a partial cross-sectional side view of the bicycle fork illustrated in FIG. 2 taken along view lines 3—3.

Referring first to FIG. 1, a perspective view of conventional, prior art BMX-style bicycle forks 1 are shown. These forks 1 include a generally U-shaped section of tubing that has two spaced apart leg portions 4, and an upper arched portion 2. A stem tube 3 is welded to the apex of upper arched portion 2. Wheel drop outs 6 are welded to lower ends of leg portions 4. The prior art forks 1 are typically made from steel tubing, and have welds that are susceptible to cracking.

Turning now to FIG. 2, a perspective view of the bicycle forks 10 of the invention is shown. Bicycle forks 10 include a crown 12, a stem tube 14 engaged with crown 12, and a pair of struts 16. As shown, the struts 16 have drop-outs 40 at their lower ends 38.

Crown 12 also has a central bore 30 formed through a central portion 18 of crown 12, which extends from a top surface 22 to a bottom surface 24 of crown 12. Central bore 30 is sized and dimensioned to accept a bottom end 32 of stem 14, as described below. Cut-out bores 34 can also be formed through crown 12 to reduce the weight of crown 12. In the embodiments illustrated in the drawings, four such cut-out bores 34 are formed through crown 12, such as by a boring process.

Stem 14 is attached to central portion 18 of crown 12 such that stem 14 projects upwardly from top surface 22 of crown 12. In a typical embodiment, this is accomplished by inserting a bottom end 32 of stem 14 into central bore 30 in crown 12 to thereby attach stem 14 to the crown 12. Preferably, stem 14 is attached to the crown 12 by mechanical means, such as by press-fitting a bottom end 32 of the stem 14 into central bore 30 of crown 12. However, other suitable attachment means, such adhesive means, can be used. In such an attachment method, to further inhibit the rotation of the stem 14 within the crown 12, a locking pin 36 or equivalent mechanical anti-rotation means can optionally also be utilized. (As used in this application, the terms "mechanical attachment" and "mechanically attached" are meant to connote "non-welding.") However, if central bore 30 is sized slightly larger (e.g. 0.05 mm to 0.1 mm [0.002 "to 0.004."]) than outer diameter of bottom end 32, an extremely secure attachment can be achieved of press-fitting parts. Also, if stem 14 is made of steel and crown 12 is made from aluminum, the aluminum crown 12 will tend to "clamp" around bottom end 32 of stem 14, and further secure it.

Turning back to FIG. 12, strut 14 is shown. As can be seen stem 14, between bottom end 32 and an upper end 72 of stem (which can optionally have thinner wall tube wall material) is a transition area 74, which transitions between the thicker outer wall of lower end 32 and the thinner outer wall of upper end 72. This optionally arrangement saves stem weight without compromising the strength of stem 14. Lastly, as optional step ring 76 can be formed on bottom of bottom end 32.

Figure 13:
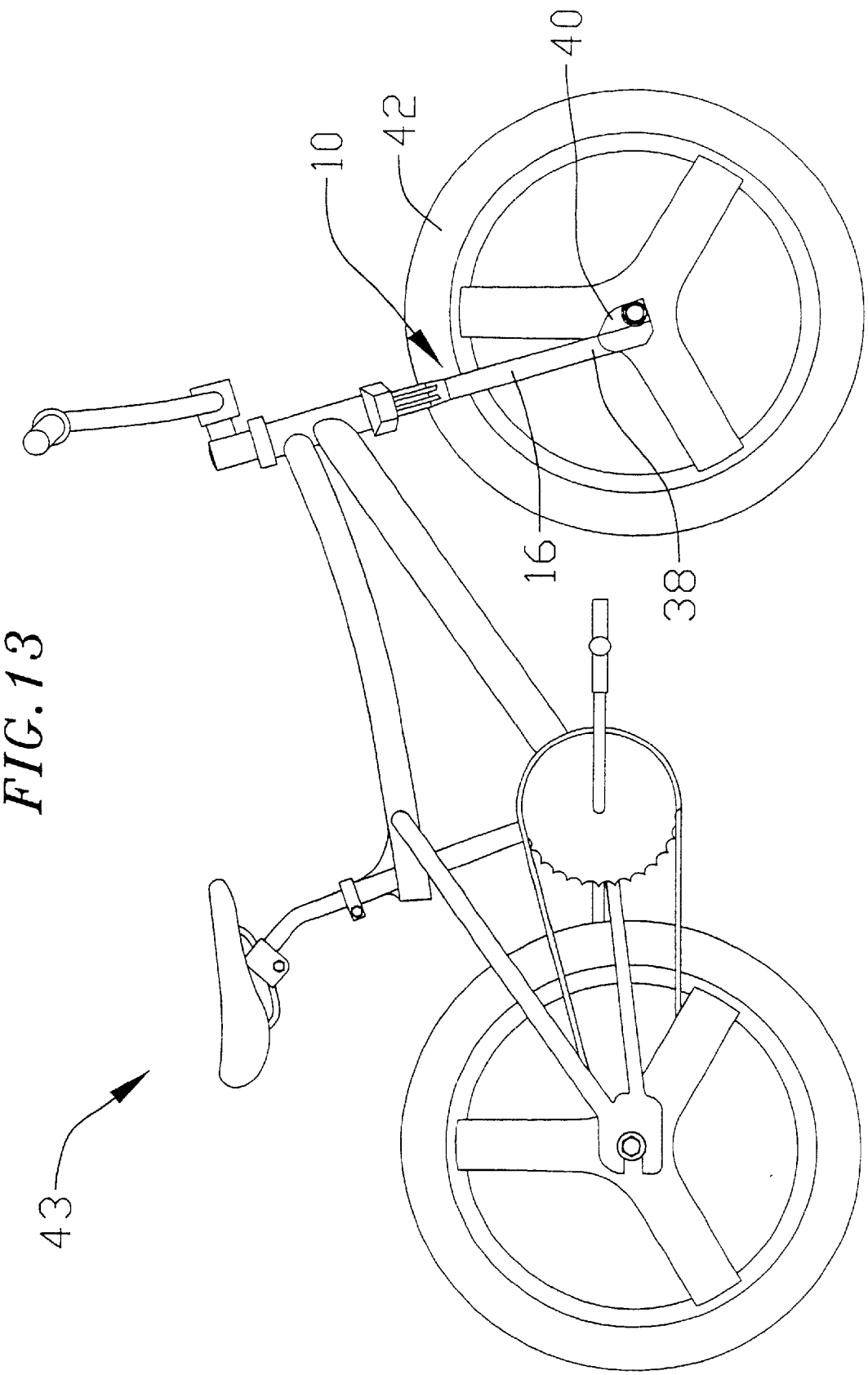
FIG. 13 is a side view of a BMX style bicycle fitted with the bicycle forks of the invention.

Struts 16 are tubular in nature, each having a top end 28 and a bottom end 38. Drop-outs 40 at bottom end 38 of each strut 16 are used for mounting a bicycle wheel 42 of a bicycle 43 onto the bicycle fork 10, as can be seen in FIG. 13. As can be seen, drop-outs 40 are integral with struts 16, and are preferable formed when the aluminum extrusion shown in FIG. 10 is milled to form struts 16.

Top end 28 of each strut 16 is mechanically attached to one of the opposed side portion 20 of the crown 12, such that two struts 16 project downwardly from the bottom surface 20 of crown 12 in parallel to one another. Both struts 16 are made from a material having a density considerably less than the density of steel, such as aluminum.

To strengthen struts 16 with respect to axial and lateral forces, each strut 16 is preferably internally reinforced with a reinforcing web 44 as illustrated in FIG. 10. In FIG. 10, reinforcing web 14 has a generally Y-shaped cross-section and extends continually throughout the length of each strut 16. Other reinforcing web profiles can also be used. As noted above, struts 16 can preferably be formed from continuous extrusions, with material being milled away where required.

The optional reinforcing web 44 occupies a relative low percentage of the internal volume 58 of each tubular strut 16. Generally, as wall thickness 60 of struts 16 increase, the need for reinforcing web 44 decreases, and vice versa.

Struts 16 are attached to extend downwardly from bottom surface 24 of the crown 12 by disposing top end 28 of each strut into one of the side bores 26 in the crown 12. Once disposed within a side bore 26 of the crown 12, each strut 16 is rigidly retained within the crown 12 by mechanical means. In a preferred embodiment illustrated in FIG. 3, the mechanical means can comprise an end cap 46 with female threads 62 which is threadably attachable to complementary male threads 64 on top end 28 of each strut 16. In a preferred embodiment, such as illustrated in FIG. 3, end cap 46 is inwardly tapered from the top surface 66 of end cap 46 to a lower end 68 of end cap 46. Side bores 26 are similarly inwardly tapered from the top surface 22 to bottom surface 24 of crown 12. In this preferred embodiment threading of end cap 46 onto male threads end 64 of top end 28 of a strut 16 will draw strut 16 up into side bore 26 of crown 12 and tightly secure it therein. End caps 46 preferably have turning means, such as a central wrench opening 50 to accommodate an Allen wrench or similar tool to facilitate the threading of the end caps 46 onto male threads 64 at top end 28 of struts 16.

To tightly secure the end cap 46 in place, thread locking compounds can be used. Preferably, the bicycle forks 10 of the invention further comprises anti-rotational means for preventing each strut 16 from rotating within its respective side bore 26. In the preferred embodiments of the invention, this can be accomplished by providing each side bore 26 with a lowermost "out of round" portion and the top end 26 of each strut 16 with a matching uppermost "out of round" portion. In the embodiment illustrated in the drawings, such "out of round" portions are provided by one or more longitudinal ribs 52 disposed on external surface of the upper end 26 of each strut 16 and by corresponding grooves 54 within a lowermost portion 56 of each side bore 26. In embodiments having this design, when each strut 16 is disposed within a side bore 26, each longitude rib 52 on the external surface 70 of upper end 26 of that strut 16 nests within a corresponding groove 54 within side bore 26. The correspondence of grooves 54 to ribs 52 prevents any rotation of the strut 16 within the side bore 26. In a preferred version of this design, each strut 16 comprises at least one, and preferably two or more. Indeed, the use of corresponding ribs and grooves increases the contact area between upper end 26 of struts 16 and side bores 26 ribs and grooves.

As noted above, struts 16 are made from a material having a density less than that of steel. Aluminum alloys have been found to be an ideal material for construction of the struts 16.

The invention provides an inexpensive, sturdy bicycle forks of considerably lighter weight than bicycle forks of the prior art, which can be assembled without welding. This allows for rapid and inexpensive repairs to the bicycle forks should either of the struts become damaged. The invention is especially important to the users of high performance BMX bicycles and to competitors in so-called BMX bicycling competitions.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A bicycle fork comprising:
   (a) a crown having a central portion, a pair of opposed side portions having out of round bores formed therein, a top surface and a bottom surface;
   (b) a stem having a top end and a bottom end, the bottom end of the stem being attached to the central portion of the crown such that the stem projects upwardly from the top surface of the crown; and
   (c) a pair of opposed struts, each having a top end and a bottom end, the top end of each strut being out of round and disposed in each one of the out of round bores to prevent rotation of the struts in the bores and secured therein by holding means to prevent the struts from longitudinal movement within the out of round bores such that the struts project downwardly from the bottom surface of the crown.

2. The bicycle fork of claim 1, wherein both bores extend from the top surface to the bottom surface of the crown and wherein the holding means securing each strut within a respective bore comprises an end cap which is attached to the top end of each strut.

3. The bicycle fork of claim 2, wherein each end cap is female threaded and the top end of the struts are male threaded, the end cap being threadably attached to the top end of the struts.

4. The bicycle fork of claim 1, wherein each bore has a lowermost out of round portion and wherein the top end of each strut has a matching uppermost out of round portion so that, when the upper end of each strut is disposed within a respective bore, each strut is prevented from rotating within that bore.

5. The bicycle fork of claim 1, wherein the top end of each strut has an external surface with one or more longitudinal ribs and wherein each bore has a lowermost portion having matching grooves, so that, when each strut is disposed within each bore, each rib nests within a groove, thereby preventing the rotation of each strut within its respective bore.

6. The bicycle fork of claim 1 wherein the external surface of each strut has at least two longitudinal ribs formed thereon for strengthening the struts.

7. The bicycle fork of claim 1 wherein both struts are made from an aluminum alloy.

8. The bicycle fork of claim 1, wherein each strut is internally reinforced with a reinforcing web to strengthen the strut with respect to axial and lateral forces.

9. The bicycle fork of claim 8 wherein the reinforcing web has a Y-shaped cross section.

10. The bicycle fork of claim 1 wherein central position of crown has a bore formed therethrough which is sized to tightly receive the bottom end of the stem so that when the bottom end of the stem is fitted within the bore in the central portion, the stem projects upwardly above the top surface of the crown.

11. The bicycle fork of claim 1, wherein the drop outs are formed at the bottom end of the struts, the drop outs being unitary with the struts.

12. The bicycle fork of claim 1, wherein the stem comprises a tube with thicker tube wall in the bottom end than in the top end.

13. The bicycle fork of claim 1, wherein the crown and two struts comprise aluminum alloy and the stem comprises steel.

14. A bicycle fork comprising:
(a) a crown having a central portion, a pair of opposed side portions, a top surface and a bottom surface, the crown further having a bore formed through both opposed side portions;
(b) attachment means extending from the crown for connection to a bicycle frame; and
(c) a pair of separate opposed tubular struts, each having a top end and a bottom end, the top end of each strut being fixedly disposed within a respective bore in opposed side portions of the crown, such that the struts project downwardly from the bottom surface of the crown in parallel to one another, each strut being internally reinforced with a reinforcing web to strengthen the strut with respect to axial and lateral forces;
wherein each bore has a lowermost out of round portion and wherein the top end of each strut has a matching uppermost out of round portion such that when the upper end of each strut is disposed within a respective bore, each strut is prevented from rotating within that bore.

15. The bicycle fork of claim 14, wherein the top end of each strut has an external surface with a plurality of longitudinal ribs and wherein each bore has a lowermost portion having matching grooves, so that, when each strut is disposed within each bore, each rib nests within a groove, thereby preventing the rotation of each strut within its respective bore.

16. The bicycle fork of claim 14, wherein the struts and crown are formed from an aluminum alloy.

17. The bicycle fork of claim 14, wherein the reinforcing web has a Y-shaped cross section.

18. The bicycle fork of claim 14, wherein the drop outs are formed at the bottom end of the struts, the drop outs being unitary with the struts.

19. The bicycle fork of claim 14, wherein the stem comprises a tube with thicker tube wall in the bottom end than in the top end.

20. The bicycle fork of claim 14, wherein the top end of each opposed tubular strut has threads, and each of the opposed tubular struts are secured within the bores by an end cap which is threadably attached to the threaded top end of the struts.

21. A bicycle fork comprising:
(a) a crown having a central portion, a pair of opposed side portions, a top surface and a bottom surface;
(b) attachment means extending from the crown for connection to a bicycle frame; and
(c) a pair of opposed struts, each strut being internally reinforced with a reinforcing web means to strengthen the strut with respect to axial and lateral forces and each strut having a top end and a bottom end, the top end of each strut being attached to one of the opposed side portions of the crown such that the struts project downwardly from the bottom surface of the crown in parallel to one another.

22. The bicycle fork of claim 21 wherein the reinforcing means comprises a web.

23. A bicycle fork comprising:
(a) a crown having a central portion, a pair of opposed side portions, a top surface and a bottom surface, the crown further having a bore formed through both opposed side portions, each bore having at least one groove formed in sidewalls of the bores;
(b) attachment means extending from the crown for connection to a bicycle frame; and
(c) a pair of opposed tubular struts, each having a top end and a bottom end, the top end of each strut having an external surface with at least one longitudinal rib adapted to engage with the grooves on the sidewalls of the bores, the top end of each strut being disposed within a respective bore in opposed side portions of the crown and secured within such bore with an endcap, such that the struts project downwardly from the bottom surface of the crown in parallel to one another;
wherein when the upper end of each strut is disposed within a respective bore, with at least one of the ribs nesting within at least one of the grooves, rotation and lateral movement of each strut within its respective bore i s t hereby prevented.

24. The bicycle fork of claim 23, wherein each strut has internal reinforcing means to strengthen the strut with respect to axial and lateral forces.

25. A bicycle fork comprising:
(a) a crown having a central portion, a pair of opposed side portions, a top surface and a bottom surface, the crown further having a bore formed through both opposed side portions;
(b) attachment means extending from the crown for connection to a bicycle frame; and
(c) a pair of opposed tubular struts, each having a top end with threads and a bottom end, the top end of each strut being disposed within a respective bore in opposed side portions of the crown and secured within such bore by an end cap which is threadably attached to the top end of the strut, such that the struts project downwardly from the bottom surface of the crown in parallel to one another, each strut being internally reinforced with a reinforcing web having an Y-shaped cross section to strengthen the strut with respect to axial and lateral forces;

wherein each bore has an out of round portion and wherein the top end of each strut has a matching out of round portion such that when the upper end of each strut is disposed within a respective bore, each strut is prevented from rotating within that bore.

26. A bicycle fork comprising:

(a) a crown having a central portion, a pair of opposed side portions having out of round bores formed therein, a top surface and a bottom surface;

(b) a stem having a top end and a bottom end, the bottom end of the stem being attached to the central portion of the crown such that the stem projects upwardly from the top surface of the crown; and (c) a pair of opposed struts, each having a top end and a bottom end, the top end of each strut being out of round an d disposed in the out of round bores with fixation means to prevent rotation and longitudinal movement of the struts in the bores and such that the struts project downwardly from the bottom surface of the crown, wherein the external surface of each strut has at least two longitudinal ribs.

* * * * *